A. L. DE LEEUW.
HEAVY DUTY STRUCTURE.
APPLICATION FILED JUNE 21, 1913.
1,132,534.
Patented Mar. 16, 1915.
11 SHEETS—SHEET 1.
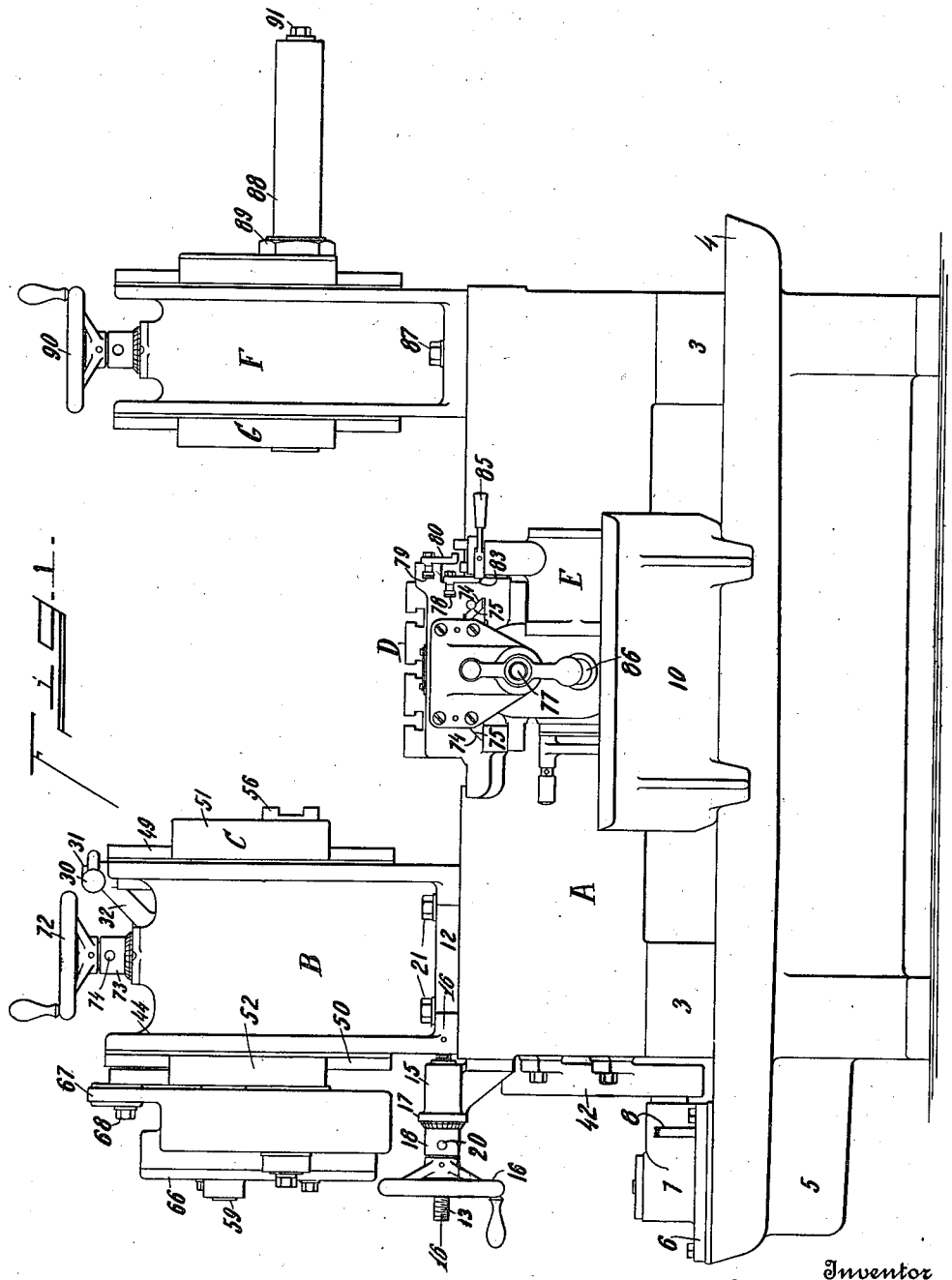

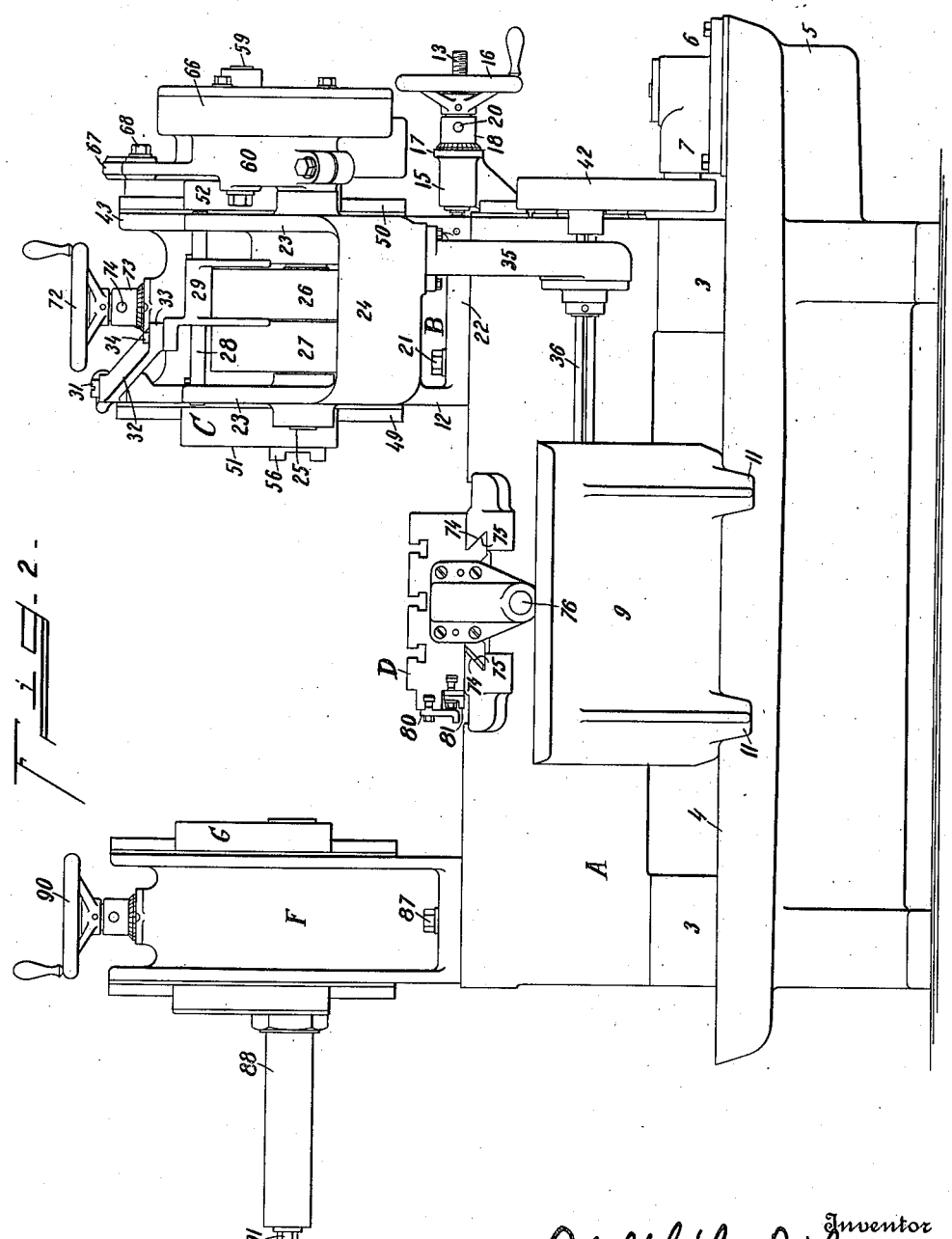

A. L. DE LEEUW.
HEAVY DUTY STRUCTURE.
APPLICATION FILED JUNE 21, 1913.
1,132,534.
Patented Mar. 16, 1915.
11 SHEETS—SHEET 3.
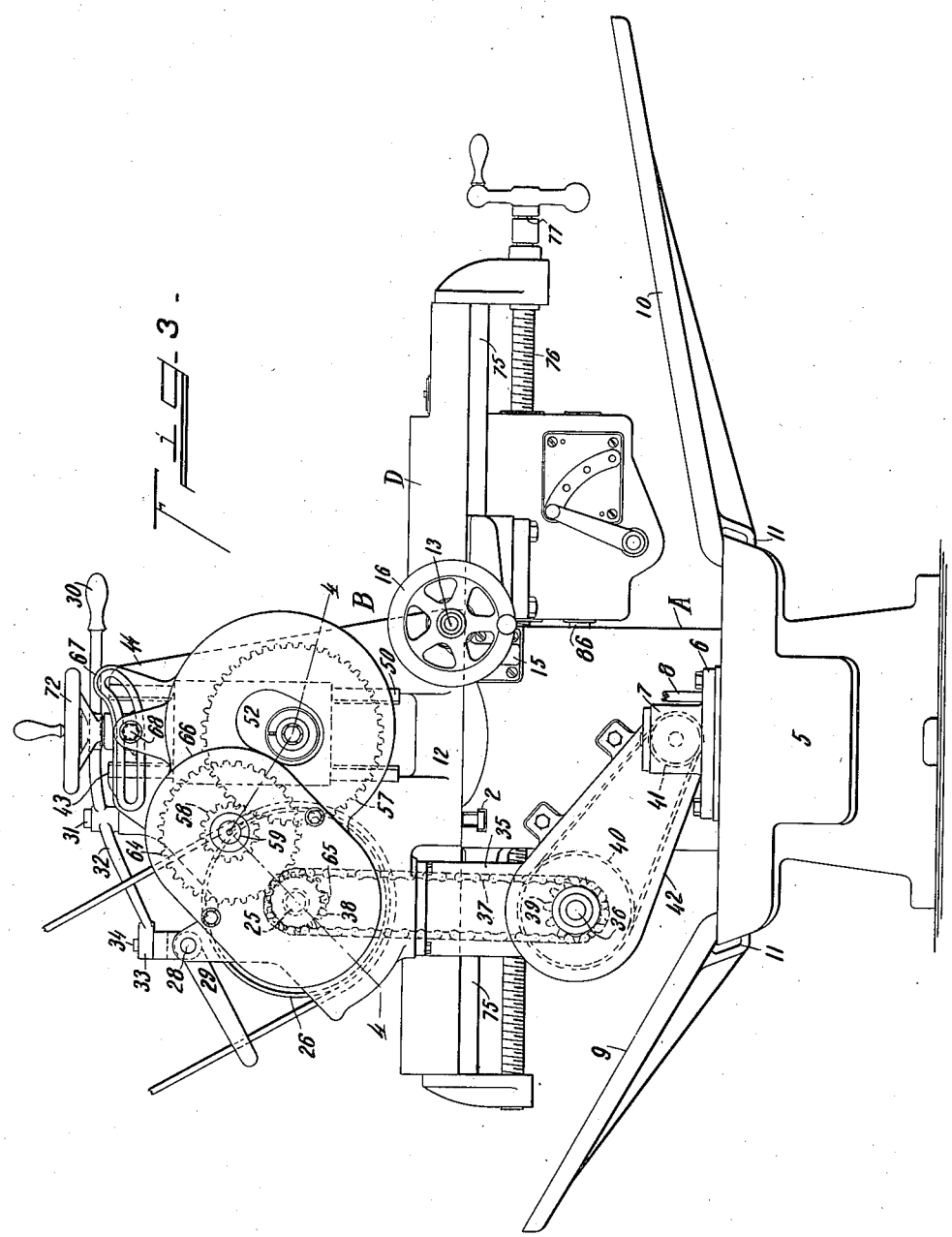
Witnesses
Clarence B. Foster
Emma Spener
Inventor
Adolph L. De Leeuw
By Wood Wood & Nathan
Attorney

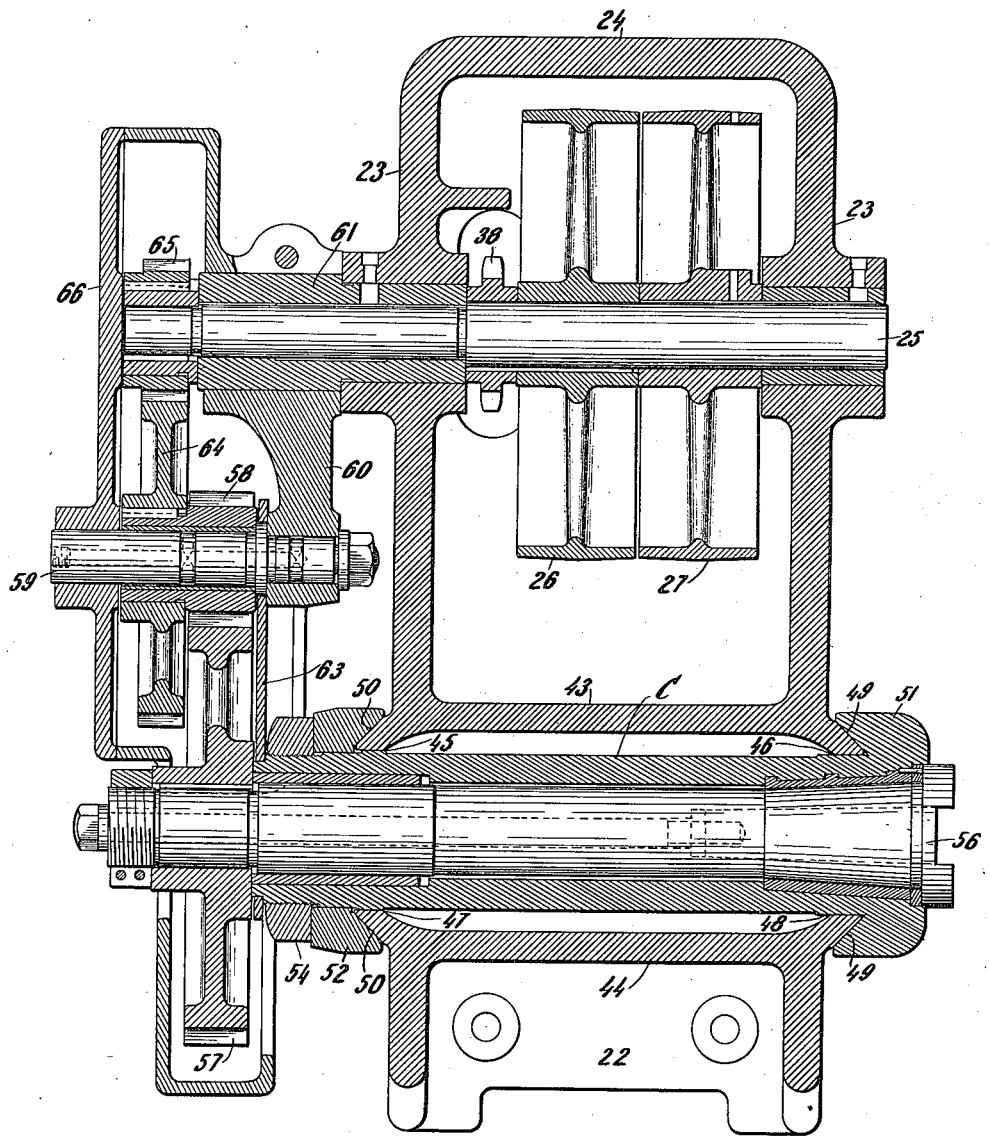

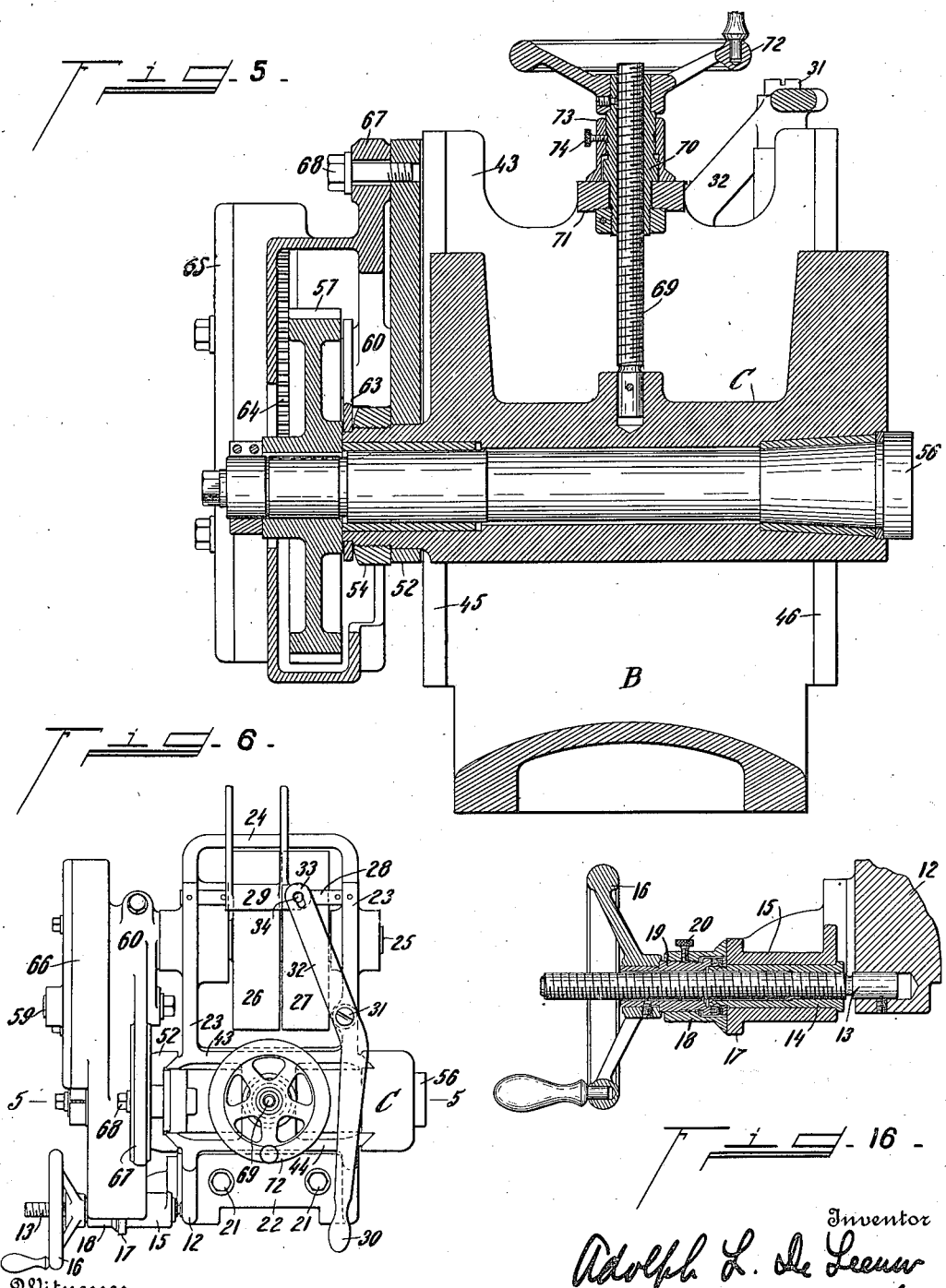

A. L. DE LEEUW.
HEAVY DUTY STRUCTURE.
APPLICATION FILED JUNE 21, 1913.
1,132,534.
Patented Mar. 16, 1915.
11 SHEETS—SHEET 6.
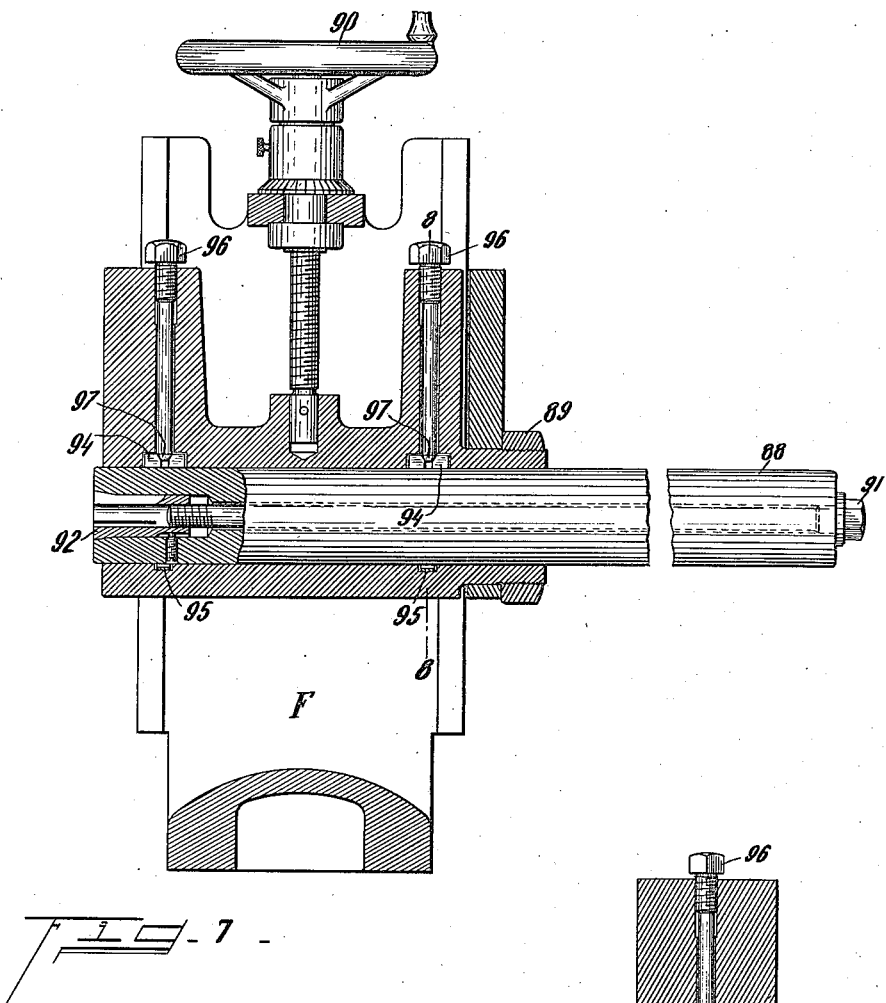
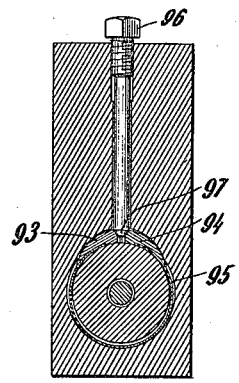

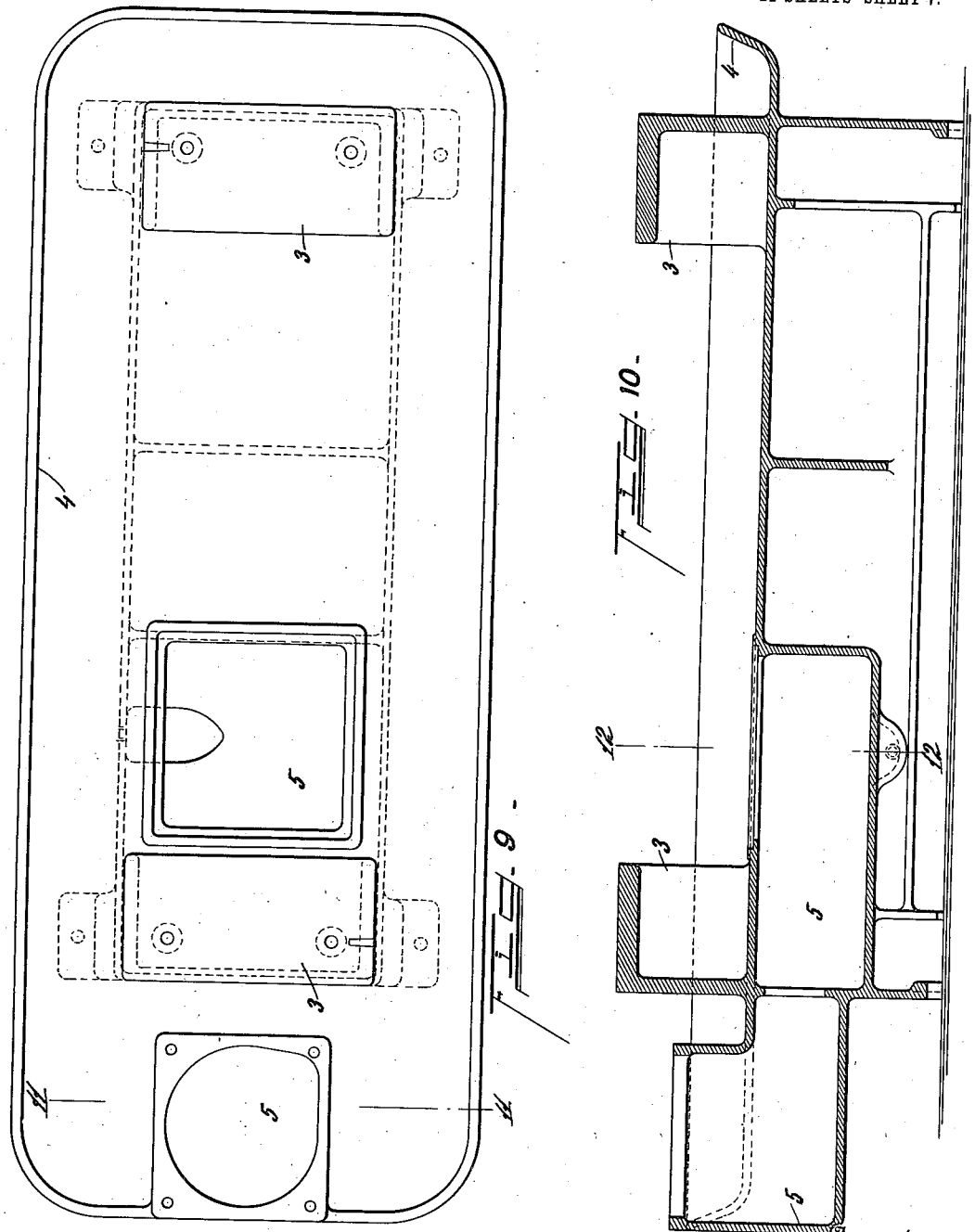

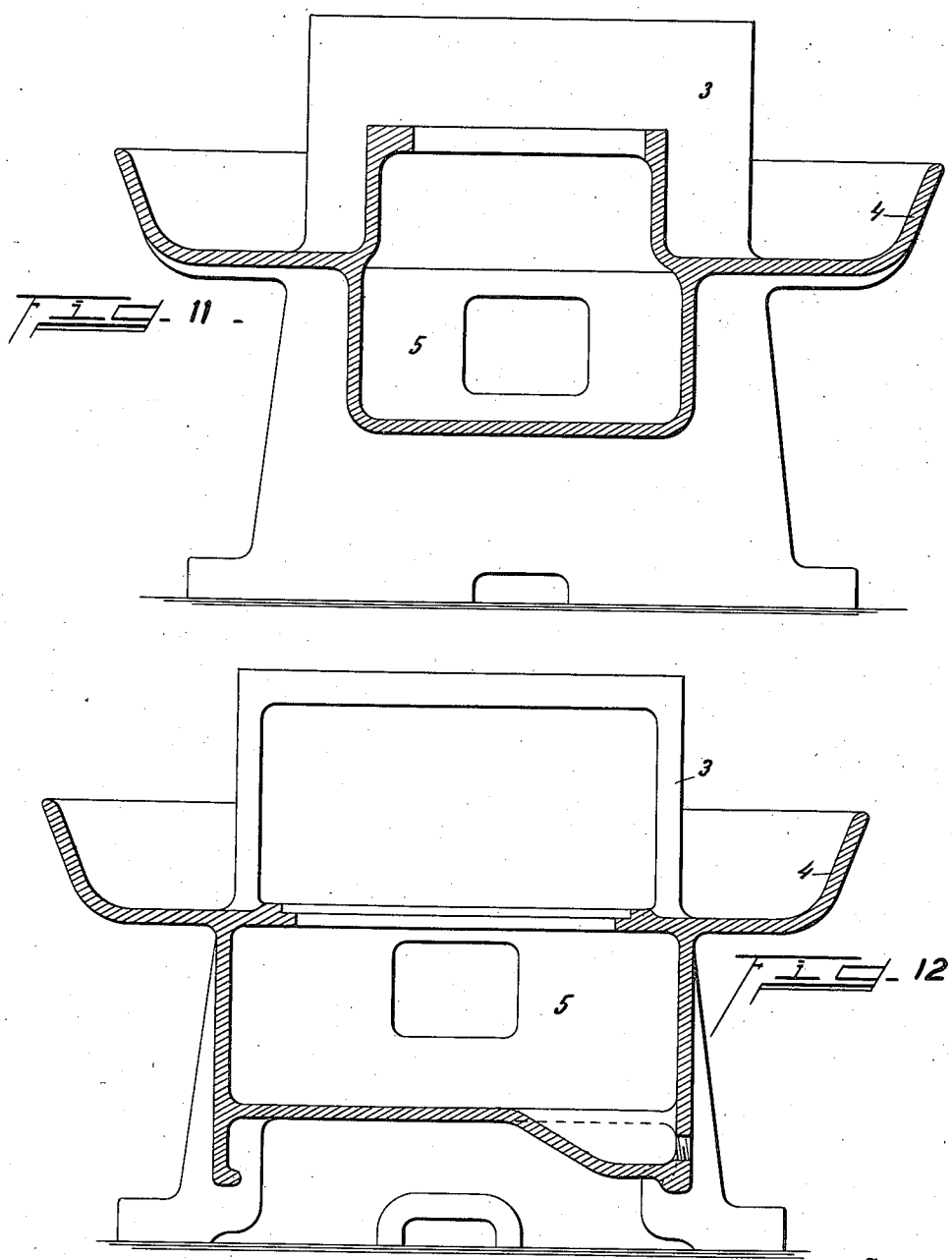

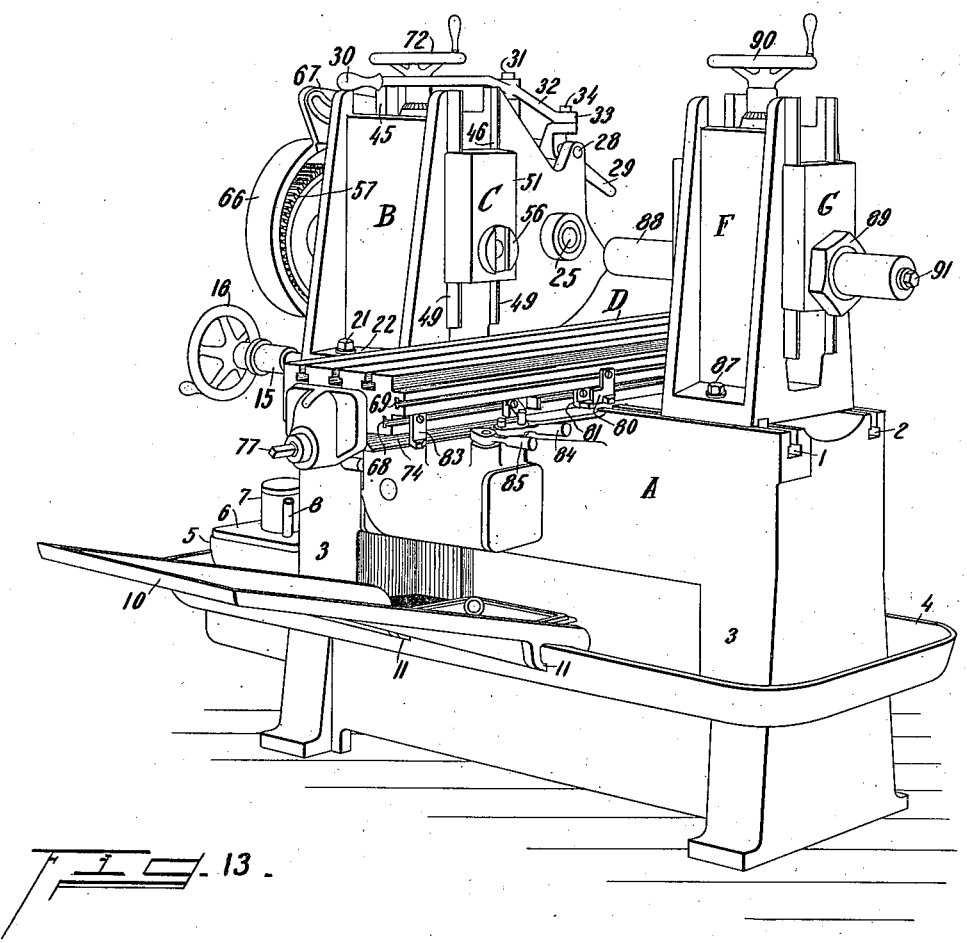

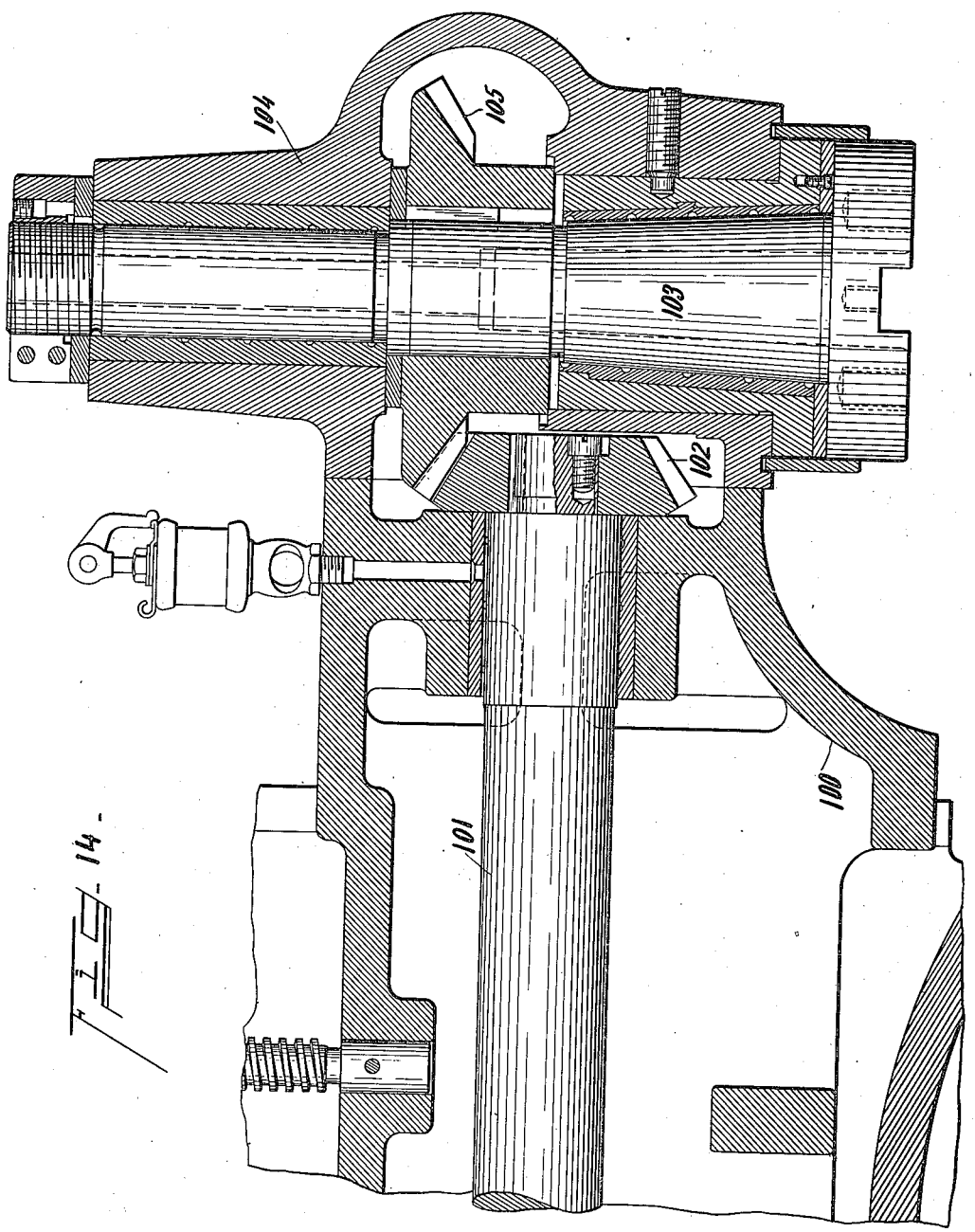

A. L. DE LEEUW.
HEAVY DUTY STRUCTURE.
APPLICATION FILED JUNE 21, 1913.
1,132,534.
Patented Mar. 16, 1915.
11 SHEETS—SHEET 11.
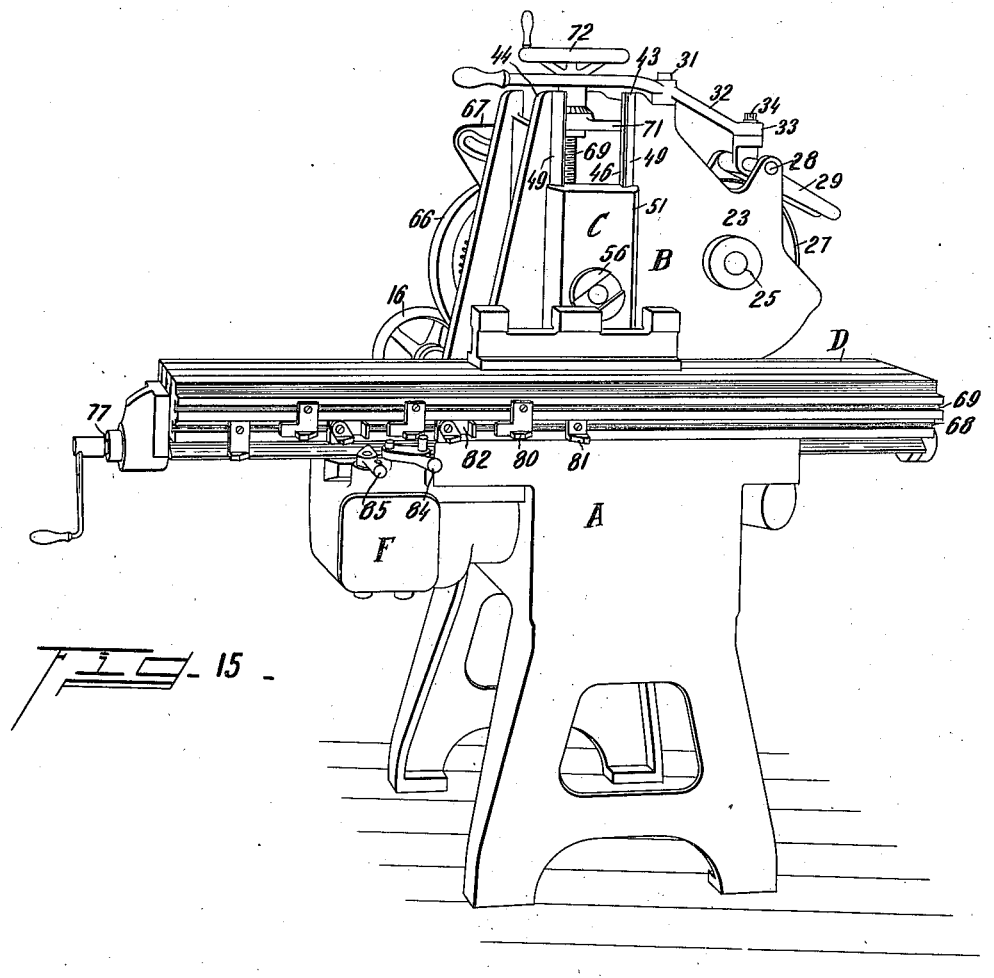

UNITED STATES PATENT OFFICE.

ADOLPH L. DE LEEUW, OF CINCINNATI, OHIO, ASSIGNOR TO THE CINCINNATI MILLING MACHINE COMPANY, OF CINCINNATI, OHIO, A CORPORATION OF OHIO.

HEAVY-DUTY STRUCTURE.

1,132,534.     Specification of Letters Patent.     Patented Mar. 16, 1915.

Application filed June 21, 1913. Serial No. 775,118.

*To all whom it may concern:*

Be it known that I, ADOLPH L. DE LEEUW, a citizen of the United States, and residing at Cincinnati, in the county of Hamilton and State of Ohio, have invented a new and Improved Heavy-Duty Structure, of which the following specification is a full disclosure.

This invention relates to machine tools and it is more particularly concerned with the type in which the work is caused to travel in operative relation with a rotary cutter.

A primary object of this invention is to create a milling machine organization especially adapted for high duty work in which heavy and rapid cuts will be taken in the work and the same finished with the greatest possible despatch, and to so design and proportion the parts and elements and combine the same with various features of construction that great compactness and rigidity, coupled with a high capacity will be attained.

Another object within the contemplation of this invention is to devise a milling machine organization adapted for heavy manufacturing, and which may be manufactured into a number of modified types, each best conforming to some particular requirement and without necessitating great manufacturing expense.

Another object is to provide a machine tool in which the spindle will be adjustable into various positions on its head or other supporting part of the frame, and which by reason of superior structural arrangement, providing a very positive clamping action, such spindle will be in all its positions substantially as rigid as though mounted in a solid head.

Another object is to devise a very compact relation betwen the reciprocating table and the speed change box that controls the rate and direction of travel of the table by automatic features operated by dogs adjustable on said table.

Other objects will be in part obvious from the annexed drawings and in part indicated in connection therewith by the following analysis of this invention.

This invention accordingly consists in the features of construction, combination of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a front elevation; Fig. 2 is a rear elevation; and Fig. 3 is a right hand end elevation of a machine embodying this invention. Fig. 4 is a section through line 4—4 of Fig. 3. Fig. 5 is a vertical section axial with the spindle through the head, through line 5—5 of Fig. 6, showing details of the spindle adjustment and drive. Fig. 6 is a top plan view of the head. Fig. 7 is a vertical section through the tail-stock. Fig. 8 is a section through line 8—8 of Fig. 7, showing details of the clamping device for the arbor support. Fig. 9 is a plan view of the base; and Fig. 10 is a longitudinal vertical section thereof. Fig. 11 is a transverse vertical section through line 11—11 of Fig. 9; and Fig. 12 is a similar section through line 12—12 of Fig. 10. Fig. 13 is a perspective of the foregoing organization. Fig. 14 is a sectional elevation of a modified head provided with a vertical spindle support. Fig. 15 is a perspective of a modification of this invention showing the tail-stock omitted. Fig. 16 is a section on line 16—16 of Fig. 1.

Continuing now by way of a more detailed description, it will be convenient to describe this structure by way of certain of its major elements.

The bed A consists of a heavy frame providing guide-ways 1 and 2 in its upper surface for positioning the head and tail-stock of the tool. This bed is supported on legs 3 and it rises from a pan 4 that is adapted to receive any oil flowing down the legs or dripping from the bed, and to drain the same into an oil well 5 here in the form of a box cast integrally with the legs and the pan 4 in a manner more clearly shown by the drawings. This oil well has an opening to receive the oil drained by the pan and as its operative features are more fully described in my copending application, Serial No. 776,017, filed June 27, 1913, they will not here be detailed. A casting 6 forming a cover plate and a housing for the operative features is bolted to the box 5 and it provides a part 7 that journals the propelling shaft of the pump. A pipe 8 extends through this top casting 6 and receives the oil delivered by the pump and conveys it to certain wearing surfaces of the machine, as will be hereinafter more fully outlined. For the purpose of catching residues dripping from the overhanging portions of the table, chutes 9 and 10 may project laterally from the pan 4 and preferably are detachably mounted on the same by means of lugs 11 extending from their under sides and receiving the edges of the pan 4.

The head B consists of a main casting 12, the bottom of which is finished to interfit with the slide-ways 1 and 2 of the bed, and this head is adjustable along said slideways, and to enable it to be moved conveniently, a screw 13 is keyed to the casting 12 and projects through a nut 14 journaled in a bracket 15 extending from the bed. This nut 14 is in turn rotated by a hand-wheel 16 and to enable the extent of movement accurately to be determined a peripheral part 17 on the bracket coöperates with a member 18 rotatable with the nut and by means of graduations on these respective elements, the extent of rotation may be accurately determined. The part 18 is preferably journaled on the wheel supporting shank piece 19 and is capable of being temporarily fixed in any desired position by means of a thumbscrew 20 so that the zero setting of the graduations may be arbitrarily made at any position of the casting 12 on the bed. To enable the head to be locked on the bed, one or more T-bolts and nuts 21 pass through holes in a flange 22 of the head and coöperate with the underlying slots of the guide-ways 1 and 2, and thus enable the casting to be drawn tightly onto the bed.

Extending at one side of the casting 12 are two walls 23, which, together with an end wall 24 form a pocket for draining oil, and also form bearings for the driving pulley shaft 25. This shaft is journaled at one end in the inside wall 23 and its other end projects through the outside wall and supports certain means for transmitting motion to the spindle, as will be hereinafter described. Keyed to the shaft 25 is a driving pulley 26, and loosely mounted concentrically with said shaft is a loose pulley 27.

Slidably mounted on a shaft 28 supported by the walls 23 is a belt shifting fork 29 which is reciprocated by a handle 30 at the end of a lever pivoted at 31 to the main head casting and having an operating arm 32 terminating in a slotted end 33 receiving a stud 34 projecting from the fork 29.

Depending from the casting 12 radially from the shaft 25 is a tubular bracket 35 in the lower end of which is journaled a shaft 36 which is driven by the sprocket chain 37 (see Fig. 3) riding from sprocket 38 on the pulley shaft 25, and sprocket 39 on the shaft 36, which conveys the power for feeding the table and also provides for the operation of the oil pump. This latter is accomplished by means of a pulley 40 mounted on its end, which coöperates with a corresponding pulley 41 on the driving shaft of the pump. A casing 42 is bolted to the bed and incloses the belt and pulleys, and it is to be noted that the sprocket 37 is splined to the shaft 36 so as to permit of bodily movement of the bracket 35 and its contained elements axially of the shaft 36.

The spindle carrier C consists of a block in which is journaled the spindle, and which is slidably adjustable on the head B in a direction toward and away from the plane of the table. This spindle carrier extends between legs 43 and 44 provided by the bifurcated head B. The latter preferably provides four parallel bearing surfaces 45—46—47 and 48 normally each in close proximity with corresponding bearing surfaces provided by the spindle carrier C, and each arranged in widely separated pairs. Oppositely converging pairs of bearing faces 49 and 50 are also provided by the legs 43 and 44 and the inner pair 49 coöperate with similar bearing faces on the head 51 of the spindle carrier C. A pressure member 52 is slidably mounted on a stud 53 extending rearwardly from the spindle carrier C and a clamp nut 54 screw-threaded to said stud enables the clamping member 52 to be forced toward the elongated head 51. By reason of a slight spring in the legs 43 and 44 of the head casting B, all of the bearing surfaces are brought into tight binding relation and a most rigid mounting is provided.

The spindle support C is apertured and a suitable spindle 56 is journaled in the same and is driven by a gear 57 keyed to its outer end. This gear in turn meshes with an intermediate 58 that is mounted on a stud 59 carried by an arm 60 pivoted to a part 61 concentric with the pulley shaft 25. A link 63 maintains coincidence of the pitch lines between the gears 57 and 58, and the latter is fast to a gear 64 that is maintained in proper pitch relation with a pinion 65 by means of the arm 60, as will be understood. A housing 66 is secured to the arm 60 and protects the gears, and for the purpose of more rigidly supporting it after the parts have been adjusted it is provided with an extension 67 having a slot receiving a bolt 68 extending from the support, and which may be tightened up to secure all of said parts rigidly together.

It will be perceived that the organization of the head thus far described permits of any desired adjustment of the spindle, and at the same time maintains a positive direct drive for the same in all of its positions and also enables the same to be most rigidly clamped in any of its positions. The means for moving the spindle support consists of a screw 69 pinned to the support and extending vertically through a nut 70 mounted in a cross-yoke 71 and turned by means of a hand-wheel 72. This wheel provides an adjustable collar 73 with a lug screw 74 for enabling micrometer adjustments to be obtained in the manner recited in connection with the hand-wheel 16.

It is noteworthy that the power control hand 30 for shifting the driving belt as well as the handle 72 for the vertical adjustment of the spindle carrier, and also the hand wheel 16 for effecting a transverse movement of the head on the bed which is accessible to the operator at the front of the machine, that is, at the same side of the machine providing handles for controlling the movements of the table. The mounting and arrangement of this plate may now be described.

The table D as here shown is elongated and adapted to reciprocate transversely to the bed, it being slidably mounted thereon by means of suitable guide-ways 74, said table having counterpart guide-ways 75 in its under face. A feed-screw 76 is journaled at its ends in said table, and the front end 77 of the feed screw projects slightly and is contoured to receive an operating handle or wheel to permit of hand actuation should that be desired. Extending along one side of this table are two slots 78—79 located in different planes and which adjustably carry dogs 80—81—82 and 83 which automatically actuate control levers 84 and 85 uprising from a speed change box E that is arranged at the front side of the bed A underneath the table D, and which receives power by means of a shaft 86 extending transversely through the bed parallel with the table and geared at its rear end to the shaft 36 previously described. This speed change box is constructed in the manner disclosed and claimed in my copending application, Serial No. 651,644, filed September 27, 1911, and it need not be more specifically described in this instance.

The foregoing organization will be complete for many classes of work, but to satisfy other requirements, the bed A may extend beyond the tripping side of the table D, and a tail stock for supporting an arbor may be used according to the following construction.

The tail-stock F consists of a bifurcated casting having an interfitting relation with grooves in the bed and adapted to be held in place by means of bolts 87 in a way similar to that already described. An arbor support 88 is mounted in a carrier G, which is in turn vertically adjustable in the tail-stock F, and is adapted to be locked in place by means of a clamp-nut 89, the construction in this respect being similar to that already described in connection with the parts B and C. A hand wheel 90 is provided to enable the necessary refinement of movements of the arbor support 88 to be made.

Referring to Fig. 7, it is noted that the arbor support 88 is in the form of a cylinder preferably apertured to receive a bolt 91 adapted to operatively engage the collet chuck 92. This member 88 is adapted to be locked in any position by means of the two lune-shaped wedge-blocks 93 and 94 which are seated in a corresponding aperture in the casting and are normally held in place by a spring 95 to enable the member 88 to be withdrawn without displacement of the wedge blocks. The casting is apertured at the juncture of the two wedge-blocks and a bolt 96 having a conical end 97 is adapted to be forced inwardly against corresponding seats provided by the wedge blocks 93 and 94 to force the same into clamping relation with the member 88.

Referring to Fig. 14, there will be seen a modification enabling the use of a vertical spindle. In this form, 100 indicates a spindle carrier in which is journaled a shaft 101, this shaft terminating in a bevel gear 102. The spindle itself is in this form indicated by 103, and it is journaled in a casting 104 suitably secured to the carrier member 100. Keyed to the spindle is a bevel gear 105 which meshes with the gear 102, and enables the spindle to be driven, as will be understood without further explanation.

Having thus revealed my invention, I claim as new and desire to secure by Letters Patent of the United States:—

1. A machine tool of the nature disclosed combining a bed, a head mounted thereon and providing a box-like portion forming an oil draining structure, a power driven shaft journaled in the walls of said structure, a wheel for propelling said shaft contained within said box-like structure, a tubular bracket depending from the bottom of said structure and having a bearing, an actuating shaft mounted in said bearing, and a transmission extending from said power driven shaft to said actuating shaft through said bracket.

2. A machine tool of the nature disclosed combining a bed, a head mounted thereon and providing a box-like structure overhanging at one side of said bed, a power driven shaft journaled in the walls of said structure, a wheel for propelling said shaft mounted in said structure, a bracket depending from the bottom of said structure and extending at one side of said bed, an actuating shaft journaled in said bracket at one side of said bed, and a transmission extending from said actuating shaft through the bottom of said structure to said power driven shaft.

3. A machine tool of the nature disclosed combining a bed, a bifurcated head mounted thereon, a spindle carrier vertically slidable in the bifurcation of said head, a spindle journaled in said carrier longitudinally of said bed, a driving shaft journaled in said head at one side of its bifurcations, and a transmission extending from said driving shaft to said spindle.

4. A machine tool of the nature disclosed combining a bifurcated head, a spindle carrier slidable in the bifurcation of said head, clamping means for locking said carrier against movement, a spindle journaled in said carrier and projecting at one side of said head, a driving shaft journaled in said head in parallelism with said spindle, and an extensible gear train connecting said shaft and spindle.

5. A machine tool of the nature disclosed combining a bed; a table mounted to reciprocate transversely of said bed; a head mounted on said bed at one side of said table; a spindle mounted to be vertically adjusted on said head; a power-driven shaft mounted to be supported by said head and located at one side thereof; gearing connecting said shaft with said spindle; links automatically controlling the engagement of the teeth of said gearing; a transmission geared to said power shaft and extending downwardly and terminating adjacent said bed; table feeding means; and a shaft extending longitudinally of said bed at one side thereof and operatively connecting said transmission with said table feeding means.

In witness whereof, I hereunto subscribe my name, as attested by the two subscribing witnesses.

ADOLPH L. DE LEEUW.

Witnesses:
   ALBERT F. NATHAN,
   OLIVER B. KAISER.